(12) United States Patent
Narayanaswami et al.

(10) Patent No.: US 7,793,108 B2
(45) Date of Patent: Sep. 7, 2010

(54) METHOD OF CREATING PASSWORD SCHEMES FOR DEVICES

(75) Inventors: Chandrasekhar Narayanaswami, Wilton, CT (US); Mandayam Raghunath, Anandanagar (IN)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 11/679,447

(22) Filed: Feb. 27, 2007

(65) Prior Publication Data
US 2008/0209222 A1    Aug. 28, 2008

(51) Int. Cl.
G06F 21/00 (2006.01)
(52) U.S. Cl. .................. 713/184; 713/182; 713/183; 711/164
(58) Field of Classification Search ......... 713/182–184; 726/26–29, 34; 380/247, 249
See application file for complete search history.

(56) References Cited

U.S. PATENT DOCUMENTS

| | | | | |
|---|---|---|---|---|
| 5,060,263 A | * | 10/1991 | Bosen et al. ............. | 713/184 |
| 7,051,209 B1 | * | 5/2006 | Brickell ................. | 713/183 |
| 2007/0206797 A1 | * | 9/2007 | Chan et al. ............. | 380/270 |
| 2007/0255953 A1 | * | 11/2007 | Peyret .................. | 713/168 |
| 2008/0001724 A1 | * | 1/2008 | Soleimani et al. ....... | 340/10.51 |
| 2008/0072052 A1 | * | 3/2008 | Suzuki ................. | 713/176 |

OTHER PUBLICATIONS

"Nokia Unveils RFID Phone Reader", Mar. 17, 2004, RFID Journal.*

* cited by examiner

*Primary Examiner*—Hai Tran
*Assistant Examiner*—Daniel Potratz
(74) *Attorney, Agent, or Firm*—McGinn IP Law Group PLLC; Vazken Alexanian

(57) ABSTRACT

A method of creating a password scheme for a mobile device includes partitioning a storage space on the mobile device into a public portion and a secure portion and encrypting access to the secure portion of the storage space by creating a long password, where the long password being composed of a series of bits of data previously stored on the mobile device in an non-encrypted form. Creating a long password includes assigning portions of the long password to a plurality of media files already stored on the mobile device and concatenating each of the portions of the long password to form the long password. The long password is used to decrypt data stored in the secure area of the mobile device.

1 Claim, 2 Drawing Sheets

METHOD OF CREATING PASSWORD SCHEMES FOR DEVICES

BACKGROUND OF THE INVENTION

1. Field of the Invention

The present invention relates to a method and apparatus for protecting sensitive information on a portable device. More particularly, the present invention is directed to a method of protecting sensitive information on a portable device using a long passphrase.

2. Description of the Related Art

Mobile devices currently available in the market provide several functions. Examples of such devices include cellular phones, MP3 players, portable media players that play video, PDAs, digital cameras, portable game consoles, etc. The portable nature of these devices makes them very useful. In addition, these devices now include significant amounts of data storage. For example, an Apple iPod is available with and 80 GB drive. Several MP3 players with up to 10 GB of flash memory are already available. Some cell phones include 10 GB of storage.

The amount of storage space in these mobile devices is expected to increase over time. As a consequence, people are storing sensitive data on these devices. The sensitive data includes corporate and personal email, records of financial transactions, licensed music and movies, copies of government issued documents, financial and legal data, etc.

There is a need to protect the data on these devices since they can be lost or misplaced rather easily. In addition, since the devices contain sensitive data, they may be stolen. In the event a device is lost or stolen the user wants to make it very difficult for the finder to access the data stored on the device.

In order to meet this objective, the data on these devices can be encrypted with strong encryption techniques. Weak or short encryption keys or passwords will not suffice since the finder of the device theoretically has an unlimited amount of time to decipher the contents on the device. The finder/attacker could try a large number of short keys using brute force and eventually decrypt the data.

Stronger encryption techniques that are very difficult to decipher, however, demand that long encryption keys with a length of, for example, 256 bits or more, be used. This long key has to be provided to the device when the user wants to use it and access data from it.

An 8 character password from an alphabet of upper and lowercase characters plus numbers (say 64 symbols) only has an effective key length of 48 bits (8*6 bits). To provide a key length of 256 bits one would need a 43 character password/passphrase. Providing such a long key to the device in a usable, reliable and repeatable manner is challenging. There are several problems.

First, users are not likely to remember passwords that are longer than 8-10 characters. Longer passwords (passphrases/keys) that users could potentially remember can be subject to dictionary attacks, i.e., by checking phrases in a dictionary and then trying them as passphrases. Even if long passphrases can be memorized with effort, these devices typically do not have keyboards to enter long passwords.

Mobile devices are likely to be used in public spaces and this introduces additional challenges. For example, a solely voice based password may not be appropriate.

In practice, as a result of these issues, users resort to short passwords and hope that their device won't be lost or stolen. Thus, there is a need to create a new scheme to protect such data by making it easier for users to supply long encryption keys to mobile devices that have input limitations.

Present methods used to protect data on mobile devices include the keypad lock provided on cell phones, passwords on Blackberries, etc. In most cases the data on the device is not encrypted but access to the data is prevented by disabling the application until the right password is supplied. The keypad based security schemes for mobile devices can typically be broken through brute force techniques.

In some cases the device may lock the user out after a few tries but since the adversary has physical possession of the device he can attack it by bypassing this software and directly examining the storage device. For example, a storage card inside the device may be removed and read from another system.

In the simplest of the security schemes sometimes used on resource limited mobile devices the password entered by the user is compared against a stored password and if they match, the device allows access to the data on the device. This scheme is weak from the perspective of an attacker who can poke into the storage of the device and figure out what the right password is.

In some cases the passwords are transformed by a one-way hash function and the resulting hashes are stored on the mobile device. When a user logs in with a password, the entered password is hashed and checked with the hash associated with the registered password for the user. An attacker who knows the hash function and the hash output can figure out the password by trying different combinations of passwords and checking the resulting hashes. This task could be done on a powerful computer and therefore be fairly fast. Alternatively, the attacker may simply bypass the password check altogether and look at the data directly by examining the memory contents.

Some USB data keys have fingerprint sensors and require the user to validate the device with his fingerprint. This makes it possible to supply some user input through the USB key though it does not have a keyboard. One may think that a biometric such as a fingerprint or an iris scan can be converted to a unique encryption key and that the problem of supplying a strong password on mobile devices may be solved by using biometric keys. This is not, however, the case because the variability in the biometric input and the capture hardware does not make the process exactly repeatable. For example, the user may swipe the finger in a slightly different way than when he swiped his finger at registration time. For this reason it is not possible to take a hash of the registered biometric input and use it as the password since the hash will be different each time because of slight differences in the input. As a result, typically biometric verification gives a confidence interval for the match that can vary between consecutive attempts. In practice, some features of the registered biometric are determined are encrypted with a key and stored on the device if the authentication is done on locally on the device. When the user attempts to log in by supplying the biometric the features of the captured biometric are then compared with features of the registered biometric.

Typically low cost USB keys do not perform the authentication locally since they do not have a processor to do the decryption and comparison of features. Instead they use the PC to decrypt the encrypted features and perform the comparison. The key for decryption of the registered feature set is embedded in a software module in the device that runs on the PC. Some USB storage drives do include a processor to perform the decryption and comparison locally.

Some devices require a physical key or card to be attached to the device for it to function. For example, a USB key could be inserted into a desktop computer for authentication. The user could remove the key when the user is done and ensure that the desktop computer is protected when the user is away. While this works for some large stationary devices such as desktop computers that are difficult to carry around, it is not as useful in mobile devices. For example, if a mini-SD card containing the user's passphrase is used to supply the password, the user may likely keep the mini-SD card in the mobile device for convenience. In this case when the device is lost, the mini-SD card with the passphrase is lost as well.

SUMMARY OF THE INVENTION

In view of the foregoing and other exemplary problems, drawbacks, and disadvantages of the conventional methods and structures, an exemplary feature of the present invention is to provide a method of protecting sensitive information in a portable device using a long passphrase.

In accordance with a first exemplary aspect of the present invention, a method of creating a password scheme for a mobile device includes partitioning a storage space on the mobile device into a public portion and a secure portion, encrypting access to the secure portion of the storage space by creating a long password, the long password including a series of bits of data previously stored on the mobile device in an non-encrypted form, the creating a long password includes assigning at least one portion of the long password to a song stored in the storage space, assigning a portion of the long password to a salient region of a photo stored in the storage space, assigning a portion of the long password to a salient region of an image in a movie stored in the storage space, assigning a portion of the long password to a radio frequency identification tag that can be scanned with the mobile device, assigning a portion of the long password to a bar code that can be read with the mobile device, assigning a portion of the long password to a spoken phrase that is recorded by the mobile device and recognized by a speech recognition software provided on the mobile device, assigning a portion of the long password to an alpha-numeric input that is input to the mobile device through a keyboard or keypad, and concatenating each of the portions of the long password to form the long password, wherein the long password is used to decrypt data stored in the secure area of the mobile device.

Accordingly, the present invention simplifies the entry of a long password by providing easier ways to enter the password than having to remember the entire password. This is accomplished by concatenating one or more inputs to specify the password. The central idea is that several small individual inputs are easier to remember than a long single passphrase. This way the user has the ability to protect his data with a long passphrase, without having to remember the long passphrase. Furthermore, the password is used to encrypt a password determining program. Thereby, the password program itself is more secure.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
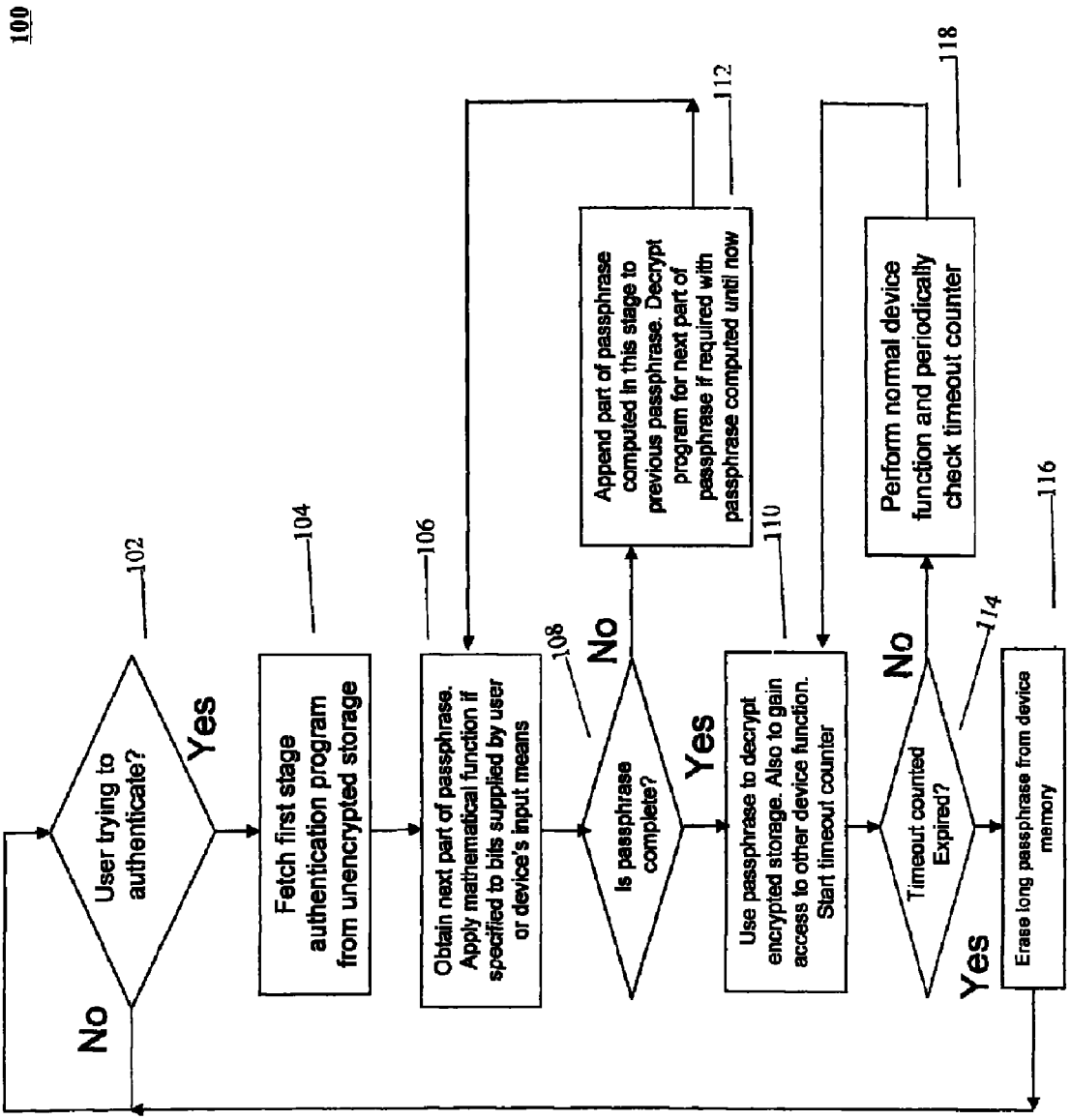
FIG. 1 illustrates a method 100 of specifying a password in accordance with a first exemplary embodiment of the present invention.

Referring now to the drawings, and more particularly to FIG. 1, there are shown exemplary embodiments of the method and structures according to the present invention.

For defense against attacks where an attacker has physical possession of the device and can dump out its memory contents, as discussed earlier, it is important to encrypt the data with a strong encryption mechanism that uses a long (for example, longer than 256 bits) key so that an exhaustive search of the key space becomes cumbersome. Also, more importantly the decryption key should not be physically stored on the mobile device in a manner that is easily obtained by an attacker who can examine the internals of the mobile device's storage.

As mentioned earlier, while it is easy for a user to remember and type in a short password, it is difficult for a user to specify such a long key on a mobile device with limited I/O capabilities.

In order to overcome the above issues the method of the present invention exploits some of the features of mobile devices. Many mobile devices store large amounts of media data in the form of photos, songs and videos. Mobile devices also have other forms of I/O capabilities, though not a traditional keyboard. Some of these capabilities include cameras, bar code readers, RFID tag readers, microphones, touch panels, etc. The present invention combines these features to make it possible for a user to easily supply a long passphrase repeatedly and reliably. The long pass phrase will be constructed by concatenation of several smaller pieces of information supplied by different means. The union of each of the smaller pieces of information is easier to remember and enter on a mobile device with non-traditional forms of input, than a single long passphrase. The part of the program that interacts with the user to obtain the sub-passphrase for any stage could optionally be encrypted with the passphrase constructed at the end of the prior stage.

In accordance with certain exemplary embodiments of the invention, mobile devices have significant amounts of storage space. Part of this space does not need to be encrypted since the data may not be private to the user and could be available publicly. Examples could include music or movie files, initial booting code for an operating system, open source operating system files, images of public sites, etc. This area is called the public area. The rest of the storage space could contain more private data and needs to be encrypted. This area is referred to as the secure area. In some cases, the storage on the device may be divided into several data partitions and an additional data partition may become accessible when the right password to another stage of the password entry process is completed. The mobile device also optionally includes one or more of an imaging device, keyboard, a bar code reader, an radio frequency identification (RFID) reader, touch panel and microphone.

Since many mobile devices already store large amounts of data, part of the passphrase for encrypting data or access could be composed from a series of bits data that is already stored on the mobile device (in an unencrypted form) such that it is easy for a user to specify the location of the bits, but it is difficult for an attacker to guess the location since there are a large number of options of where to look for this part of the decryption passphrase. Other parts of the passphrase will be created from knowledge or physical tokens possessed by the user.

In particular, a user may have a large collection of compressed audio files on the mobile device. A user picks a particular song, and an offset into the song as the key for sensitive data that is on the device. So for example, the user may select Elton John, Candle in the Wind—2 min 29 s. Part of the key is located at the point in the data stream corresponding to 2 min and 29 sec into the song. This part of the key can be 32, 64, 128, 256 bits or whatever length the user wishes and the device can support. Typically users will have several songs in the portable device and can choose part of their encryption key from one of the music files. While an attacker with physical possession of the device can read all the music files on the mobile and can also access all of the bits in those files, the attacker has no way of knowing which of the audio files is part of the actual decryption key for the sensitive data. Moreover, the length of the part of the decryption key is also not known to the attacker. These two features make brute force attacks harder. On the other hand, if the user forgets the exact location he may be able to play the song with a timing counter and then determine the time offset by checking the lyrics for the song.

Optionally for determining each part of the decryption key a bit-mask may be specified. The mask will be combined with a set of bits from the data stream to generate the part of the decryption key. For example the mask may have a length of 1024 bits of which a random 64 may be ones and the rest zeros. The mask will be ANDed with 1024 bits from the stream to generate a 64 bit number that will be used to create the part of the decryption key. Mathematical operations other than the AND can be used as well to select a subset of bits from the stream to create the part of the decryption key. The mask could be specified when the user is creating his password.

One feature of the compressed file is that the byte streams are unlikely to have repeated patterns. If there were such a repeating pattern, the compression algorithm would have used that repeating pattern to reduce the size of the file further. This is a good property to select encryption keys that are hard to guess.

Other media such as movies can also be used instead of music files. The user could also choose salient regions in one of the photos stored in the unencrypted part of the storage. For example, clicking on a particular section of a branch in a picture of a tree would indicate that bits from that region will be used in the passphrase. In another example, the x and y coordinates of the location where the user clicks could be used as the bits to append to the passphrase. In all these cases, the password entry program on the device provides a user interface that allows the user to choose the media file and offset or salient point. For example, if the user is using music files, a list of songs will be available that can be accessed by artist, title, etc., that the user can select and then indicate an offset. If a photo is used, one can be selected from an album of thumbnails. As mentioned earlier, masks can be used for each stage to obtain the bits to append to the passphrase constructed prior to this stage.

One of the requirements for this technique to work is that data from which the passphrase is constructed should not be deleted. So if the user's passphrase comes from the song Candle in the Wind by Elton John, that song should not be deleted. This can be done in practice by disabling writing to particular sections of memory or using read only memory (ROM) for this area. Typically the collection of music and other media data is typically large and therefore brute force attacks will be very time consuming.

Another piece of the passphrase could optionally originate from an RFID tag that the user possesses and can scan with the mobile device. The tag could supply a programmable number of bits to the passphrase. For example, some users may want 32 bits to be supplied from the RFID tag containing 1024 bits by using the mask mentioned earlier. The mask above could itself be encrypted using the passphrase that has been constructed up to this point, i.e., prior to the concatenation of the bits from the RFID tag. In addition, the program that reads the RFID tag could also be optionally encrypted by the passphrase constructed up to this point (sub passphrase).

Another piece of the passphrase could optionally come from reading a two dimensional bar code that the user carries in his wallet. The mobile device is used to read the bar code and will supply another set of bits that will be concatenated with the currently constructed passphrase. Just as with the RFID tag, some users may want 32 bits to be supplied t from the 2D bar code containing 1024 bits using a mask. The mask above could itself be encrypted using the passphrase that has been constructed up to this point, i.e., prior to the concatenation of the bits from the 2D bar code. In addition the program that reads the 2D bar code could also be optionally encrypted by the passphrase constructed up to this point.

Another part of the passphrase could come from speech input. The user can utter a phrase into the microphone of the mobile device. The speech software on the device recognizes the uttered phrase and converts it to a text string. It then appends the text string to the current passphrase. It is important that the utterance be converted to a unique character string so that each time the same encryption bits created from the utterance. The passphrase may be anything that the user can remember easily. The speech recognition software converts the utterance to a text string, displays it to the user who can visually verify that the speech recognition was done correctly and indicates it to the device which then generates the encryption key. This works well for wearable devices since the user may typically be in a private place when he puts on clothes and wearable computers and the use of voice is not unreasonable.

A part of the passphrase could come from alphabetic input from a keyboard, keypad, or touchpad. The touchpad could be used to select icons which can then be appended to the passphrase. The icon could represent a 64×64 bit region in the screen and the first 32 bits can be used to form part of the passphrase.

A part of the passphrase could come from another application, for example a clock viewer. The user could be shown a clock and asked to set the hands to a position that will be read and used to form the next subset of the passphrase. For example the user may set the clock to 8.49 AM. The characters 8.49 AM will then be appended to the passphrase. Clearly the user may be asked to select a month and date as well.

The passphrase constructed from the previous steps is used to decrypt data stored in the secure area of the mobile device. This passphrase is stored in memory of the device while the device is on. The device goes into standby mode after a programmable time interval for which the device has been idle. After this time, the user will need to be reauthenticated to the device.

When the user wants to change his passphrase he will be presented with an interface to specify the new passphrase. The programs that may be encrypted with sub passphrases will have to be re-encrypted with the new sub passphrases.

For ease of use (to avoid having to reauthenticate frequently) the device should have a sensor that that can detect when it is being worn and taken off. Once the device is worn, no further authentication is needed till the user takes the device off and then puts it on again. This approach only works with wearable devices.

Figure illustrates a flow chart for the present method 100 in accordance with certain exemplary aspects of the present invention. The method includes determining whether a user is trying to authenticate 102. This step is repeated until a user is trying to authenticate. Next, the first stage of the authentication program is fetched from an unencrypted storage 104. Then, a next part of the passphrase is obtained and a mathematical function is applied if specified to bits supplied by the user or the device's input means 106.

Next, it is determined whether the passphrase is complete. If not, a part of the passphrase which is computed in this stage is appended to a previous passphrase and the program for the next part of the passphrase is decrypted 112. If the passphrase is complete, the passphrase is used to decrypt the encrypted storage and to gain access to other device functions 110. Additionally, the timeout counter is now started.

Next, it is determined whether the timeout counter has expired. If not, then a normal device function is performed and the timeout counter is periodically checked 118. If the timeout counter has expired, then the long passphrase is erased from the device memory and the process is repeated 116.

Figure 2:
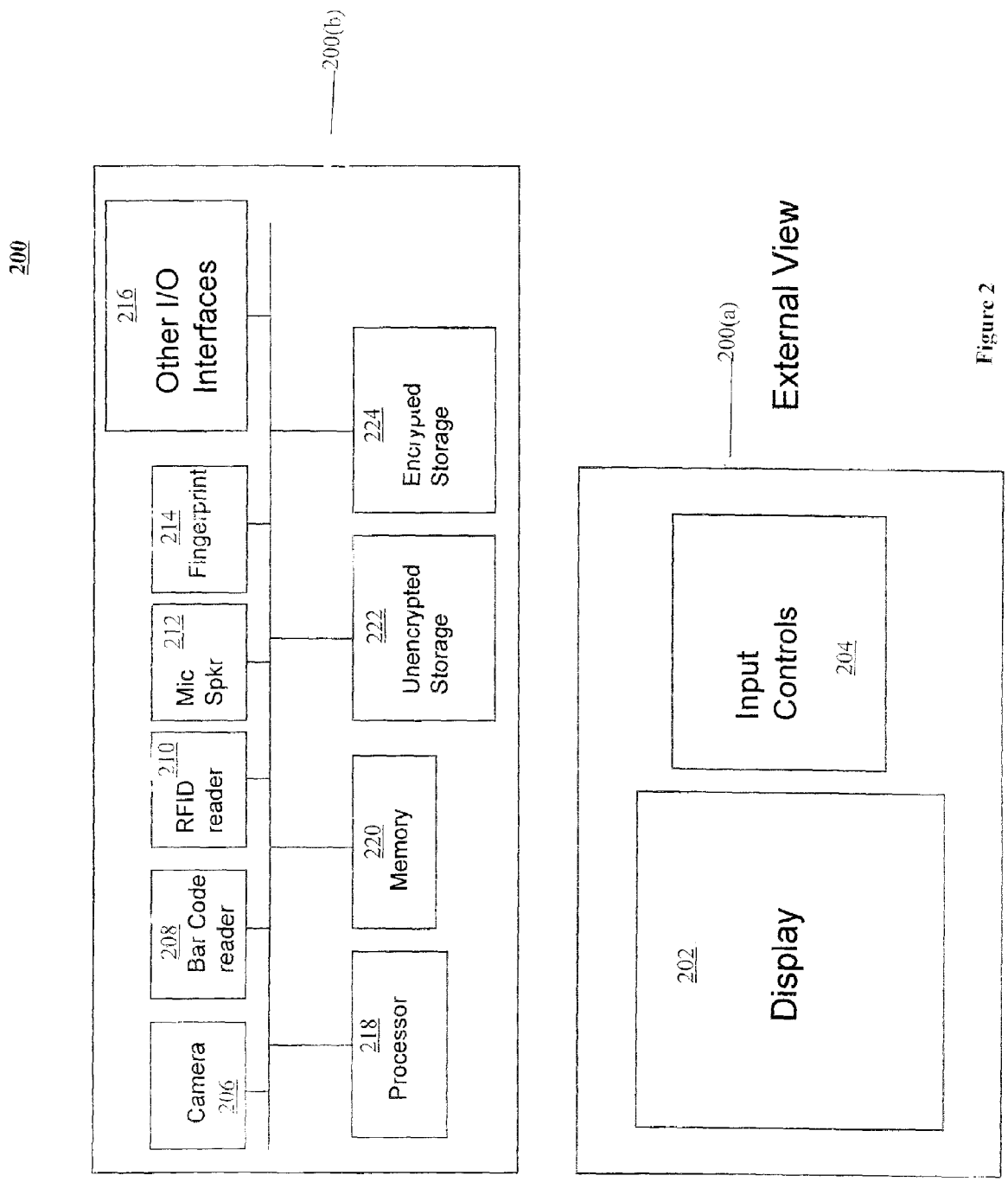
FIG. 2 illustrates a system 200 for carrying out the method of the present invention.

FIG. 2 illustrates a system 200, in accordance with certain exemplary embodiments of the present invention, for carrying out the above method of the present invention. FIG. 2 illustrates an external view 200a of the system and an internal view 200a of the system.

The system includes a display 202 and input controls 204, externally. Internally, the system includes a camera 206, a bar code reader 208, a RFID reader 210, a microphone/speaker 212, a fingerprint 214, I/O devices 216, a processor 218, a memory 220, an unencrypted storage unit 222 and an encrypted storage unit 224.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A method of creating a password scheme for a mobile device, comprising:

partitioning a storage space on the mobile device into a public portion and a secure portion;

encrypting access to the secure portion of the storage space by creating a long password, assigning at least one portion of said long password to bits of data previously stored on the mobile device in an non-encrypted form, assigning a portion of said long password to a radio frequency identification tag that can be scanned with the mobile device;

assigning a portion of said long password to a bar code that can be read with the mobile device;

assigning a portion of said long password to a spoken phrase that is recorded by the mobile device and recognized by a speech recognition software provided on the mobile device;

assigning a portion of said long password to an alphanumeric input that is input to the mobile device through a keyboard or keypad;

concatenating each of the portions of said long password to form said long password;

disabling writing to certain portions of the storage space to prevent said portions of said long password from being deleted;

performing a mathematical function on data bits retrieved from user input or from input devices on the device before concatenation, said mathematical function comprising a logical operation on a bitwise mask;

using a program to retrieve said portions of the long password at a particular stage of the program being encrypted or decrypted by the concatenated password that has been constructed at the end of a previous stage of the program;

creating the long password;

encrypting each stage of the program;

authenticating the long password;

upon authenticating the long password, starting a timer and requiring re-authentication when the timer expires; and deleting the long password from device memory upon expiration of the timer, wherein said long password is used to decrypt data stored in the secure portion of the mobile device or permit access to device functions, wherein said long password is longer than 256 bits, wherein said bits of data are retrieved from a song stored in the storage space.

* * * * *